(12) United States Patent
Imakawa et al.

(10) Patent No.: US 8,762,112 B2
(45) Date of Patent: Jun. 24, 2014

(54) METHOD OF GENERATING CAD DATA FOR EVAPORATIVE PATTERN HAVING FRAME STRUCTURE

(75) Inventors: Hiroshi Imakawa, Anjo (JP); Kozue Kato, Tokai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/823,836

(22) PCT Filed: Jan. 28, 2011

(86) PCT No.: PCT/JP2011/051821
§ 371 (c)(1),
(2), (4) Date: Mar. 15, 2013

(87) PCT Pub. No.: WO2012/101825
PCT Pub. Date: Aug. 2, 2012

(65) Prior Publication Data
US 2013/0297264 A1   Nov. 7, 2013

(51) Int. Cl.
*G06F 17/50* (2006.01)
(52) U.S. Cl.
USPC ............................................................ 703/1
(58) Field of Classification Search
USPC .................... 703/1; 700/97, 182; 706/919
See application file for complete search history.

(56) References Cited

U.S. PATENT DOCUMENTS

| | | | |
|---|---|---|---|
| 5,485,390 A * | 1/1996 | LeClair et al. | 700/182 |
| 5,680,317 A * | 10/1997 | Watanabe | 703/1 |
| 5,731,982 A * | 3/1998 | Namba et al. | 700/182 |
| 5,740,341 A | 4/1998 | Oota et al. | |
| 6,279,425 B1 * | 8/2001 | Cicotte | 76/107.1 |

(Continued)

FOREIGN PATENT DOCUMENTS

| | | |
|---|---|---|
| JP | 6-309418 | 11/1994 |
| JP | 9-50452 | 2/1997 |
| JP | 2010-3089 | 1/2010 |
| JP | 2010-33542 | 2/2010 |

OTHER PUBLICATIONS

Chan Zhilan, Yang Renwei, "Numerical Simulation of Mould Filling Process in Lost Foam Casting of Engine Cover", 2010 International Conference on Computer Application and System Modeling (ICCASM 2010) IEEE, pp. 356-359.*

(Continued)

*Primary Examiner* — Dwin M Craig
(74) *Attorney, Agent, or Firm* — Finnegan, Henderson, Farabow, Garrett & Dunner, LLP (57) ABSTRACT

A method for generating CAD data appropriate for designing an evaporative pattern having a frame structure is provided. The method includes, allocating, generating joint shape data, and extracting rod body data. Rod data includes rod body data representing a shape of a rod body and terminal data representing a shape of a rod terminal disposed at an end of the rod body. In the allocating, a plurality of rods is allocated so that the rod terminals overlap each other in a 3-dimensional space in computer. In the generating, the joint shape data is generated by merging the terminal data of the plurality of rod terminals overlapped. In the extracting, the rod body data is extracted from the rod data of the rods allocated in the 3-dimensional space. The joint shape data and the rod body data obtained by such processes correspond to the CAD data of the evaporative pattern.

3 Claims, 8 Drawing Sheets

(56) References Cited

U.S. PATENT DOCUMENTS

| | | | |
|---|---|---|---|
| 6,355,196 B1 * | 3/2002 | Kotnis et al. | 264/219 |
| 7,117,055 B2 * | 10/2006 | Mateau et al. | 700/98 |
| 2008/0234850 A1 * | 9/2008 | Bowling et al. | 700/98 |
| 2009/0319237 A1 | 12/2009 | Nishikawa et al. | |

OTHER PUBLICATIONS

Written Opinion of the International Searching Authority in International Application No. PCT/JP2011/051821 (Mar. 29, 2011).

International Preliminary Report on Patentability in International Application No. PCT/JP2011/051821 (Oct. 17, 2011).

* cited by examiner

METHOD OF GENERATING CAD DATA FOR EVAPORATIVE PATTERN HAVING FRAME STRUCTURE

CROSS-REFERENCE TO RELATED APPLICATIONS

This application is a national phase application of International Application No. PCT/JP2011/051821, filed Jan. 28, 2011, the content of which is incorporated herein by reference.

TECHNICAL FIELD

The present invention relates to a method for generating CAD data for an evaporative pattern for casting.

BACKGROUND ART

An evaporative pattern casting is a kind of casting method, and may be called a lost-foam casting or a full mold casting. This method may be generally described as below. First, a pattern is made of an evaporative material which evaporates by heat of a molten metal. The pattern is called an evaporative pattern. Next, a sand mold is made by burying the evaporative pattern therein. The molten metal is poured into a cavity of the sand mold. Here, the 'cavity' means a space which is occupied by the evaporative pattern in the sand mold. When the molten metal is poured into the cavity, the evaporative pattern evaporates by the heat of the molten metal, and the space which is occupied by the evaporative pattern is filled with the molten metal. When the sand mold is broken down after the molten metal is cooled and solidified, a casted structure perfectly having the same shape as that of the evaporative pattern is obtained. As the evaporative material, foam polystyrene or wax is typically used.

The evaporative pattern is designed by using a computer aided design (CAD). In general, the CAD is used for designing various structures. An efficient CAD technique using the characteristics of a design subject may be proposed. For example, the patent document 1 discloses a CAD technique appropriate for designing an iron rod unit.

PRIOR ART DOCUMENT

Patent document 1: Japanese Patent Application Publication No. 2010-33542

SUMMARY OF INVENTION

Technical Problem

However, a CAD technique appropriate for the evaporative pattern has not been found. The present description provides a method for generating CAD data appropriate for designing an evaporative pattern, in particular, an evaporative pattern having a frame structure.

Solution to Technical Problem

A frame structure is made by connecting plural rods to each other. The joint portion thereof may have various shapes according to a number of connected rods or a connection angle thereof. For this reason, when each joint is independently designed, a cost in design increases. On the other hand, one of the features of the evaporative pattern is that a connection member such as a bolt or a pin is not needed. Since members of the evaporative pattern are made of foam polystyrene or wax, the members can be connected by an adhesive without using a bolt or a pin. Thus, in the evaporative pattern, a complex shape for allocating the bolt or the pin is not needed. The inventors focused on a fact that, regarding the joint of the evaporative pattern having a frame structure, the shape depending on the number or the angle of the connected rods is needed but the shape for allocating the bolt or the pin is not needed. That is, the shape of the joint of the evaporative pattern is determined only by a geometric relation in the connection of the rods, and accessories such as the bolt or the pin do not need to be considered. The inventors have found that the shape of the joint depending on the number or the connection angle of the rods is determined according to a portion in which the rods overlap each other in space when a slightly elongated rod member is allocated based on the shape of the desired frame structure. In the novel method for generating CAD data which is disclosed in the present description, the generation of the data of the joint is simplified by constructing the data of the frame structure based on the slightly elongated rod.

The novel method for generating CAD data which is disclosed in the present description includes preparing, allocating, generating joint shape data, and extracting rod body data. In the preparing, rod data representing a rod is prepared. The rod data includes rod body data representing a shape of a rod body and terminal data representing a shape of a rod terminal disposed at an end of the rod body. In other words, the rod body data defines the shape of the rod body, and the terminal data defines the shape of the terminal. In the allocating, a plurality of the rods is allocated in a virtual 3-dimensional space so as to overlap the rod terminals. Furthermore, in the allocating, the rods are allocated in the virtual 3-dimensional space which is generated by a computer. In the generating of the joint shape data, the joint shape data is generated by merging the terminal data of the overlapped rod terminals in the virtual 3-dimensional space as single data. Furthermore, the process of merging data of plural components that are overlapped in space as single data is generally installed in many CAD tools. In the extracting of the rod body data, the rod body data is extracted from the rod data of the rods allocated in the 3-dimensional space. The joint shape data and the rod body data obtained by such processes correspond to the CAD data of the evaporative pattern.

According to the method for generating CAD data, the joint shape data is defined as a whole outline of the plurality of overlapped rod terminals in the 3-dimensional space. For this reason, there is no need to manually design the joint shape data that is a connection portion of the rods. Since there is no need to manually generate the joint shape data of each joint, it is possible to reduce a cost necessary for the generation of the CAD data.

It is preferable that a shape of the rod terminal is a sphere. Specifically, it is preferable that the terminal data which represents the shape of the rod terminal includes a radius of the sphere, that is the terminal shape, and a length of a column extending from the sphere and connected to the rod body. In this case, in the allocating, it is preferable to allocate the plurality of rods in the 3-dimensional space so as to overlap centers of the spheres of the rod terminals.

This is because the spheres of the terminals perfectly overlap each other regardless of an angle of the connected rods when the rod terminals are allocated with the centers of plural spheres matching each other.

When the number of the rods connected to the joint increases, there is a concern that the rods may interfere with each other. Therefore, in the generating of the joint data, it is preferable to adjust the length of the column included in the terminal data so that the rod bodies spatially do not overlap each other. Conversely, it is preferable to shorten the length of the rod body so that the rod bodies do not overlap each other. Although it is not desirable to overlap the plural rod bodies connected to the joint because they are separate components, the plural rod terminals may overlap each other. This is because the shapes of the overlapped rod terminals are integrated at one joint.

The novel method for generating CAD data which is disclosed in the present description may be realized by using a CAD tool (CAD software). Furthermore, the frame structure which is made by the plurality of rods may include a frame with a Rahmen structure, a truss structure, or a combination structure of the Rahmen structure and the truss structure.

DESCRIPTION OF EMBODIMENTS

Figure 1:
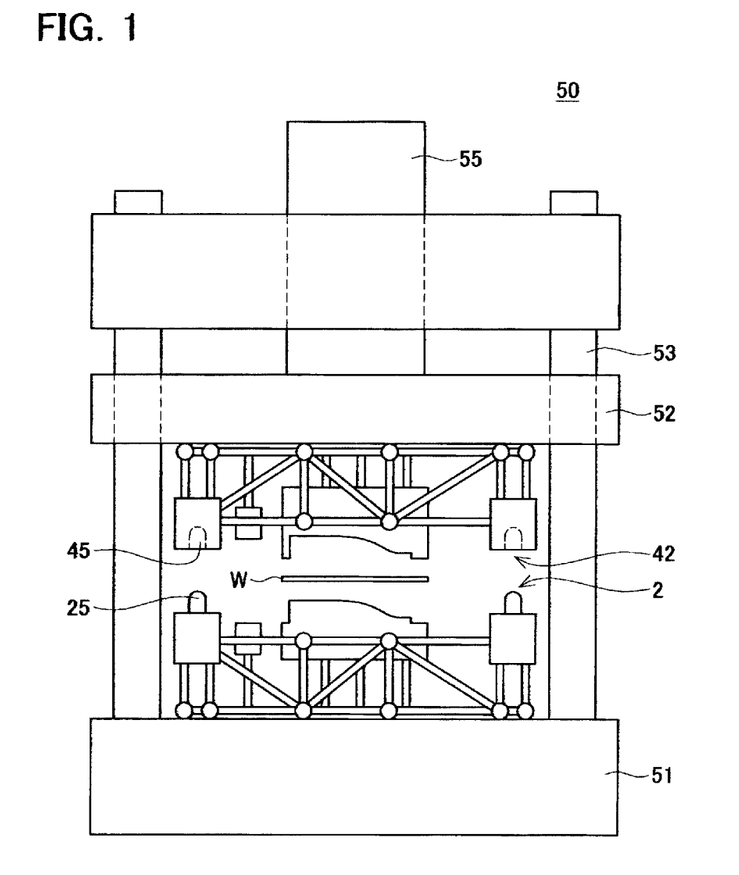
FIG. 1 is a schematic side view illustrating a press machine.
Figure 2A:
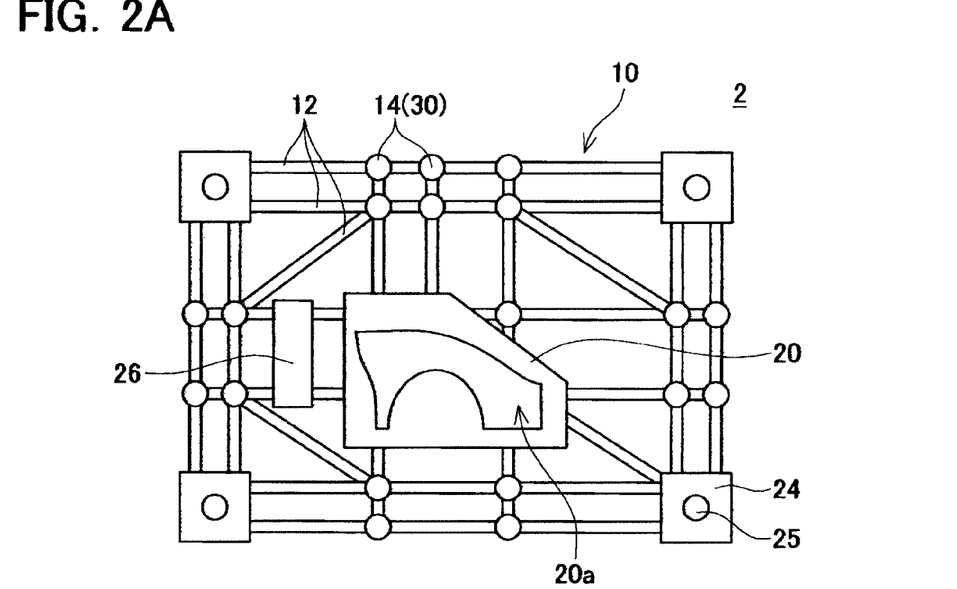
FIG. 2A is a plan view illustrating a die (evaporative pattern).
Figure 2B:
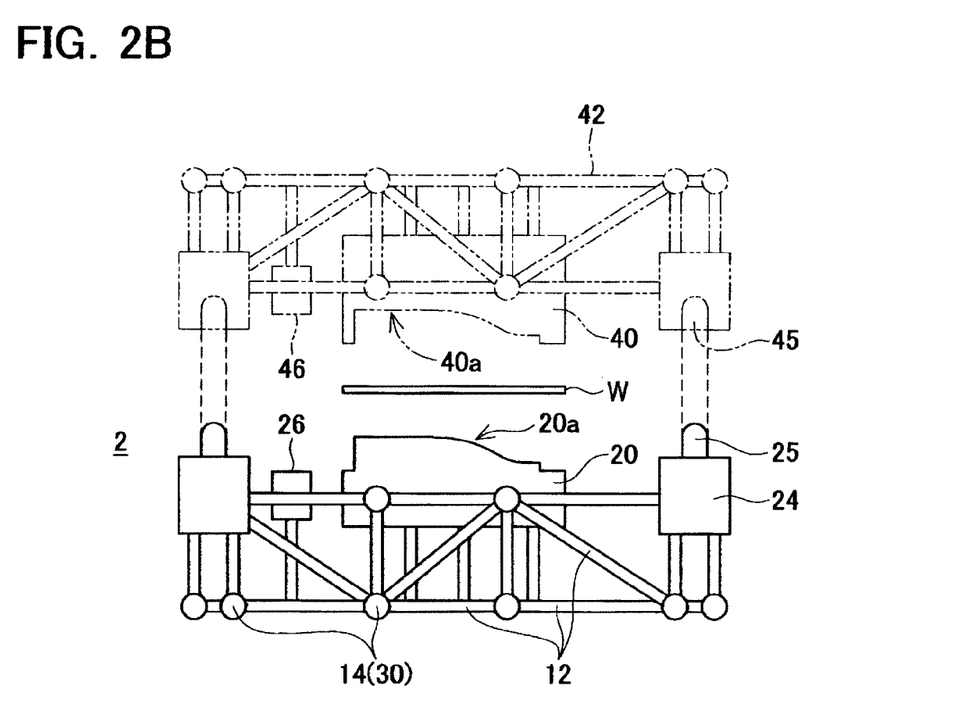
FIG. 2B is a side view illustrating the die (evaporative pattern).

Referring to the drawings, a method for generating CAD data for an evaporative pattern will be described. The evaporative pattern which is a subject of the embodiment is an evaporative pattern which is used to cast a die for machine press. In order to help with understanding, the usage example of the die for machine press will be described first. FIG. 1 is a schematic side view illustrating a press machine 50 equipped with dies 2 and 42. FIG. 2A is a plan view illustrating the die 2, and FIG. 2B is a side view illustrating the die 2. Furthermore, in FIG. 2B, the die 42 which corresponds to the die 2 is also illustrated. The die 2 is fixed to a bolster 51, and the die 42 is fixed to a slider 52. The slider 52 is moved up and down by an actuator 55 while being guided along a support column 53.

The die 2 includes a design block 20, positioning blocks 24, and a support block 26. The design block 20 includes a design surface 20a which is used to transfer a desired shape to a work plate. The dies 2 and 42 are used to press-mold a fender of a vehicle. The design surface 20a is provided with protrusions which are formed according to the shape of the fender. A design surface 40a of a counter die 42 is provided with recesses which are formed according to the shape of the fender. The positioning blocks 24 are positioned at four corners of the die 2. In the drawing, it is noted that the reference numeral 24 is given to only one positioning block and is not given to all of the positioning blocks.

When the work plate W is interposed between the design block 20 of the die 2 and the design block 40 of the die 42 and the actuator 55 moves the slider 52 down so as to apply a load to the work plate W, the work plate W is deformed according to the shape of the design surface 20a. That is, the shape of the design surface 20a is transferred to the work plate W.

At the time of matching the die 2 and the die 42 each other, guide pins 25 of the die 2 are fitted to guide bushes 45 of the die 42, so that the die 2 and the die 42 are positioned to each other. That is, the design surface 20a of the die 2 and a design surface 40a of the die 42 are positioned to each other. The guide pins 25 are installed in the positioning blocks 24. As illustrated in FIG. 2A, the positioning blocks 24 are disposed at four corners of the die 2 so as to surround the design block 20. Since the positioning blocks 24 are disposed at four corners of the design block 20, the relative position between the design surface 20a of the die 2 and the design surface 40a of the die 42 may be accurately determined.

The support block 26 is used to attach various tools that utilize a press load. As the type of tool, for example, a bending cam which rounds the end of the work, a punch which punches the work in the horizontal direction so as to make a through hole, and the like may be exemplified. A support block 46 which corresponds to the support block 26 is attached to the die 42. The tool disposed between the support blocks 26 and 46 is configured to operate the tool by using a load, which is generated when the support blocks 26 and 46 move close to each other, as a driving force.

The design block 20, the positioning blocks 24, and, the support block 26 are connected to each other through a plurality of rods 12 (rod members). Connection portions between the rods are referred to as 'joints 14'. In the drawing, it is noted that the reference numerals are given to only some of the rods and the joints and are not given to all of the rods and joints. Further, in FIGS. 1, 2A, and 2B, the joints 14 are depicted by circles, but it is noted that the joints 14 may have various shapes.

The plurality of rods 12 are combined with each other vertically, horizontally, and obliquely so as to form a frame 10. In a case where the lattice window surrounded by the plural rods 12 is rectangular, the rods 12 form a Rahmen structure. In the portion in which the lattice window surrounded by the plural rods 12 is triangular, the rods 12 form a truss structure. That is, the frame 10 has the above-described frame structure. Furthermore, the truss structure means a frame structure in which only an axial force is exerted in the rods, but a moment is not exerted therein, and the Rahmen structure means a frame structure in which both the axial force and the moment are exerted in the rods. Since the Rahmen structure and the truss structure are both formed only by the rods, an appropriate flexibility is obtained as a whole with a light weight and a high strength ensured.

As illustrated in FIG. 2A, the design block 20 is supported by the rods 12 at four sides in the top view. Further, the design block 20 is also supported by the rods 12, which are arranged in the perpendicular direction, from the rear surface thereof. Since the design block 20 is supported by the rods 12 at four sides and the rear surface, the design block may be flexibly and slightly moved even when receiving a load. That is, when a biased press load is applied to the design block, the design block 20 slightly moves so that the distribution of the press load becomes uniform. Accordingly, a deviation in the press load is solved by such a small movement. The relative position between the whole die 2 and the die 42 is accurately determined by the positioning blocks 24 at four corners. On the other hand, since the design block 20 is supported by the rods 12 at four sides and the rear surface, the design block can slightly move so as to solve a deviation in the press load. Since no biased press load concentrates on the design surface 20a, the abrasion of the die is suppressed and the high work molding precision is maintained.

The rigidity of the design block 20 is higher than the rigidity of the frame 10 which is assembled by the rods 12. Further, the rigidity of the positioning block 24 is also higher than the rigidity of the frame 10. Thus, when the press load is applied, the deformation amounts of the design block 20 and the positioning block 24 are small compared to the deformation amount of the frame 10. That is, although the whole frame 10 is deformed, the deformation of the design block 20 and the deformation of the positioning block 24 are suppressed. Since the deformation of the design block 20 is suppressed, the high work molding precision may be maintained. As described above, there are many advantages in the die 2 having the frame structure.

The die 2 is made by an evaporative pattern casting (a full mold casting or a lost-foam casting). Thus, it is needed to prepare an evaporative pattern having the same shape as that of the die 2 illustrated in FIGS. 2A and 2B. The evaporative pattern is made of an evaporative material which evaporates by heat of a molten metal. The evaporative material is typically foam polystyrene or wax. Hereinafter, a method for generating CAD data for the evaporative pattern of the die 2 having the frame structure will be described.

Figure 3:
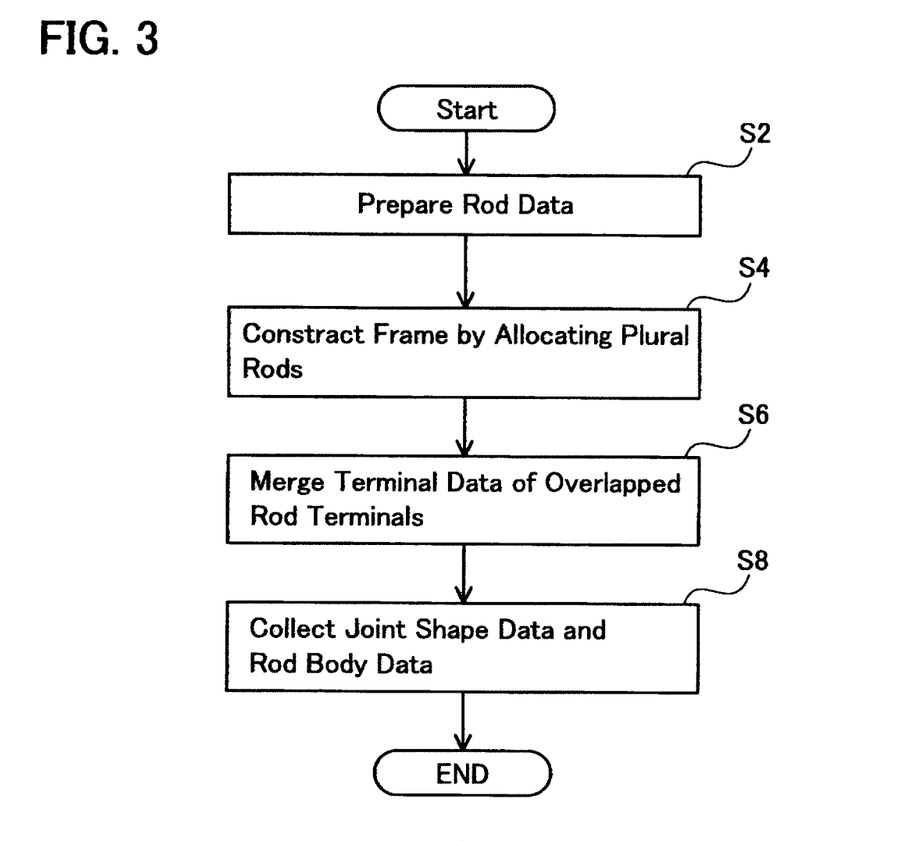
FIG. 3 is a flowchart illustrating a process of generating CAD data.

The method for generating the CAD data includes preparing, allocating, generating joint shape data, and extracting rod body data. These processes are all performed by a CAD program. FIG. 3 is a flowchart illustrating the process for generating the CAD data. In the preparing, first, basic rod data is prepared (S2). Furthermore, for example, when the rod data generated in the past is available, this process may be skipped. Next, in the allocating, a plurality of rods is allocated in a 3-dimensional space (a virtual space which is generated by a computer) based on the shape of the evaporative pattern as the subject. At this time, the rods are allocated so that the adjacent rod terminals overlap each other (S4). In the embodiment, the rods are combined with each other so as to construct the above-described frame 10. Next, an operator operates the CAD program so as to perform a process in which the shape data of the overlapped rod terminals are merged as one data (S6). The one merged data corresponds to joint shape data. Finally, rod body shape data of the rod bodies are extracted from the data of the allocated rods (S8). The shape data of the extracted rod bodies and the shape data of the joint are obtained as the CAD data of the evaporative pattern. Hereinafter, the respective processes will be described in detail.

Figure 4A:
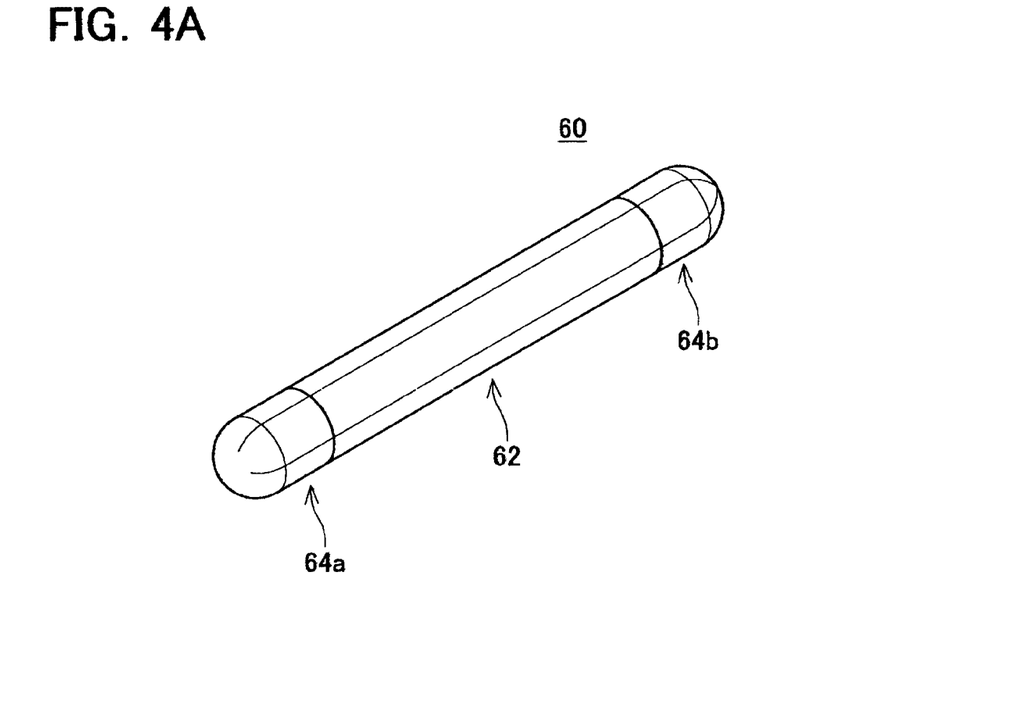
FIG. 4A is a perspective view illustrating a rod which is indicated by rod data.
Figure 4B:
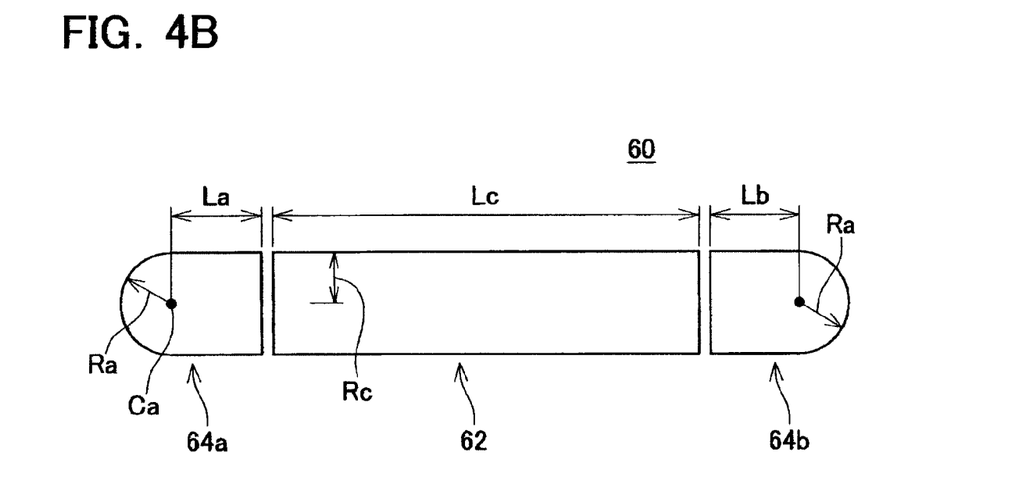
FIG. 4B is a diagram illustrating a parameter of the rod data.

(Preparing) In the preparing, rod data which will be is used as the basis for data of the plurality of rods 12 provided in the die 2 is generated. FIG. 4A illustrates a shape of a rod 60 which is represented by one rod data. FIG. 4B illustrates parameters included in the rod data.

The rod data includes rod body data which represents a shape of a rod body 62 and terminal data which represents a shape of either rod terminal 64a or 64b disposed at respective end of the rod body 62. As illustrated in FIG. 4A, the rod of the embodiment has a columnar shape having hemispherical terminals. As illustrated in FIG. 4B, the rod body 62 may be described by Rc specifying a radius of the column and Lc specifying a length thereof. That is, the radius Rc of the column and the length Lc thereof correspond to parameters of the rod body data. Further, one rod terminal 64a may be described by a radius Ra of the hemisphere and a length La of the column extending from the hemisphere and connected to the rod body 62. That is, the radius Ra of the column and the length La of a column correspond to the data of the rod terminal 64a. Furthermore, the data of the rod terminal 64a also includes a coordinate of a center Ca of the hemisphere. In the similar way, data of the other rod terminal 64b includes the radius Ra of the hemisphere, a length Lb of a column, and a coordinate of a center Cb of the hemisphere. The rod data is prepared in a CAD program in advance. As described below, one rod data which is prepared in advance is copied, if necessary, and the plurality of rods is allocated in the virtual 3-dimensional space of the computer so as to construct a frame structure. Furthermore, the radius Ra of the hemisphere (the radius Ra of the column) may be about from 10 mm to 40 mm.

By designating the coordinate of the center Ca of one terminal and the coordinate of the center Cb of the other terminal, the rod can be allocated in the 3-dimensional space. Accordingly, hereinafter, the coordinates of the centers Ca and Cb of the hemispheres may be referred to as the coordinates of the rod terminals 64a and 64b. When the coordinates of the rod terminals 64a and 64b and the lengths La and Lb of the columns of the rod terminals are specified by the CAD operator, the CAD program automatically calculate the length Lc of the rod body 62.

Figure 5:
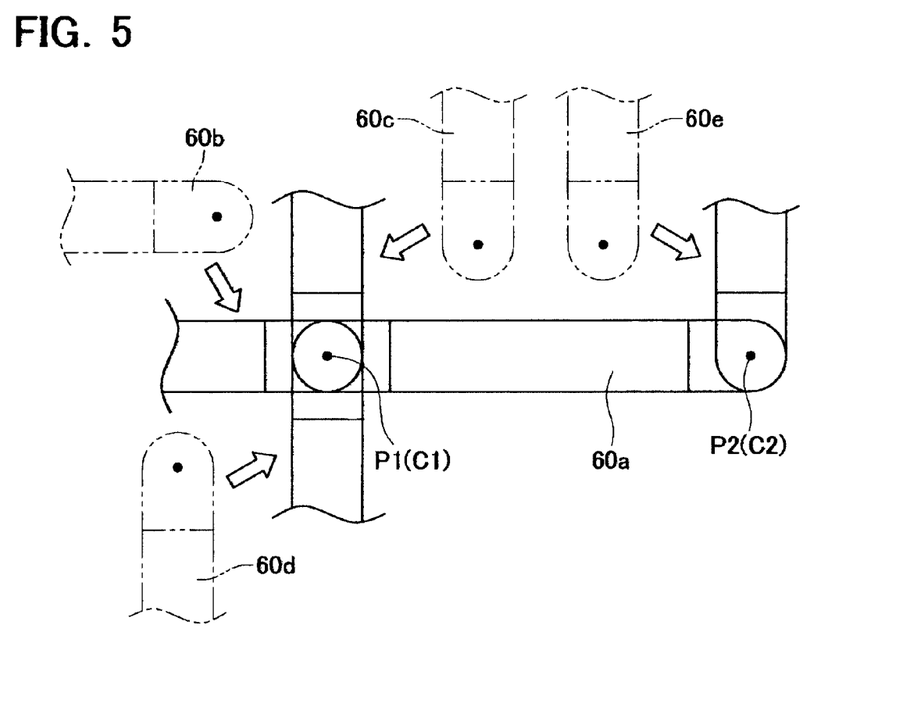
FIG. 5 is a diagram illustrating an allocating process.

(Allocating) Next, the CAD operator allocates the plurality of rods in the 3-dimensional space which is generated by the CAD computer. The CAD operator allocates the rods according to the shape of the frame of the die 2. At this time, the CAD operator allocates the rods so that the rod terminals of the adjacent rods overlap each other. That is, in this step, the CAD operator uses the rod data which represents lengths longer than the lengths of the actual rods 12. Specifically, the CAD operator allocates the rods so that the coordinates of the rod terminals of the adjacent rods (the coordinates of the centers of the hemispheres) coincide. An example of the operation conducted at this time will be described by referring to FIG. 5. The CAD operator first allocates a rod 60a. At this time, the position C1 of one rod terminal of the rod 60a is located at a coordinate P1 of the 3-dimensional space, and the position C2 of the another rod terminal is located at a coordinate P2 of the 3-dimensional space. When the coordinates of both ends of the rod 60a are determined, the CAD computer adjusts the length Lc of the rod body as described above. Next, the CAD operator allocates a rod 60b so that the one terminal is positioned at the coordinate P1. In the similar way, each of rods 60c and 60d is allocated so that the one terminal is positioned at the coordinate P1. As a result, the terminals of four rods 60a, 60b, 60c, and 60d overlap each other at the coordinate P1. Further, the CAD operator allocates a rod 60e so that the one terminal is positioned at the coordinate P2. The terminals of two rods 60a and 60e overlap each other at the coordinate P2. The same operation as that of FIG. 5 is performed for the whole die 2. Furthermore, the allocation of the design block 20 or the positioning blocks 24 (see FIGS. 2A and 2B) will be described later.

Figure 6:
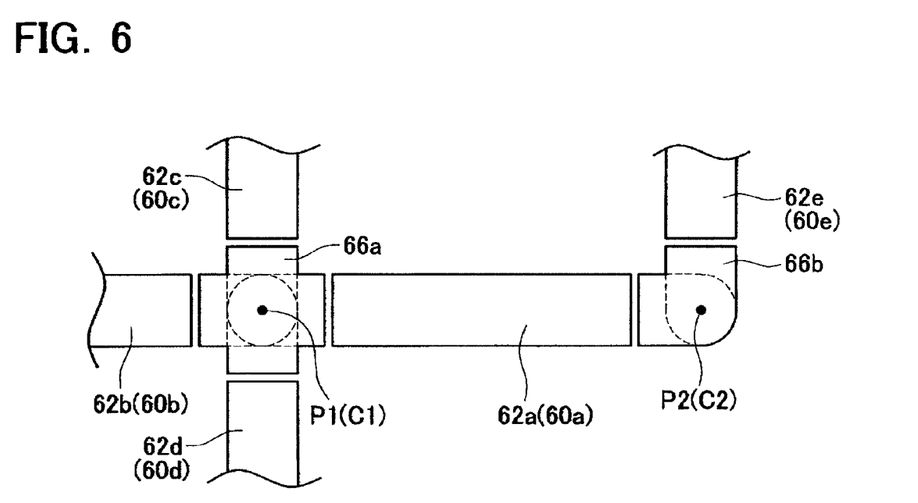
FIG. 6 is a diagram illustrating a joint shape data generating process.

(Generating Joint Shape Data) Next, the CAD operator executes a process of merging the terminal data of the plurality of overlapped rod terminals by using the CAD program. Since this process is generally installed in a normal CAD program, the detailed description thereof will be omitted. As a result, as illustrated in FIG. 6, a shape in which the terminals of the rods 60a, 60b, 60c, and 60d overlap each other is generated as one shape data. The shape data corresponds to the shape data of the joint 66a of which the center is set as the coordinate P1. In the similar way, the shape data in which the terminals of the rods 60a and 60e overlap each other is output. This data corresponds to the shape data of the joint 66b of which the center is allocated at the coordinate P2.

(Extracting Rod Body Data) Finally, the CAD operator operates the CAD program so as to collect the rod body data of the allocated rods. The joint shape data and the rod body data which are generated in this way are obtained as the CAD data of the evaporative pattern of the die 2. In the example of FIG. 6, the data of the rod bodies 62a, 62b, 62c, 62d, and 62e and the data of the joints 66a and 66b become a part of the CAD data of the evaporative pattern.

In the above-described process, the joint shape data is automatically generated without the operation in which the CAD operator manually specifies the shape. In the CAD data generating method, the CAD operator does not need to individually specify the joint shape data.

Figure 7A:
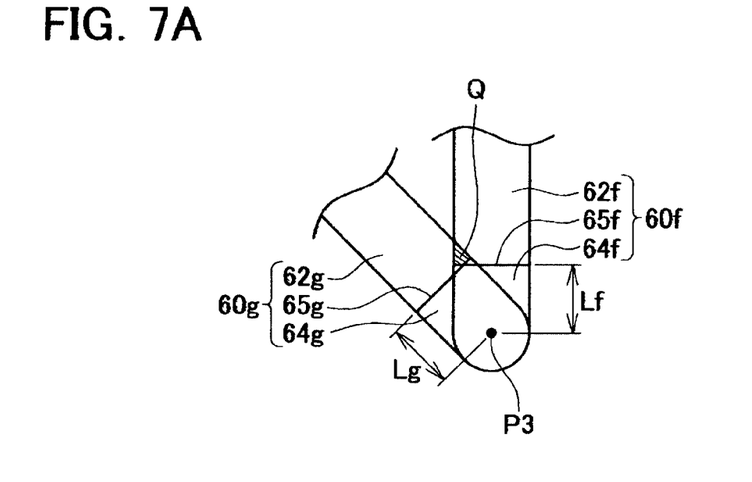
FIG. 7A is a diagram illustrating a process when rod bodies overlap each other (1).
Figure 7B:
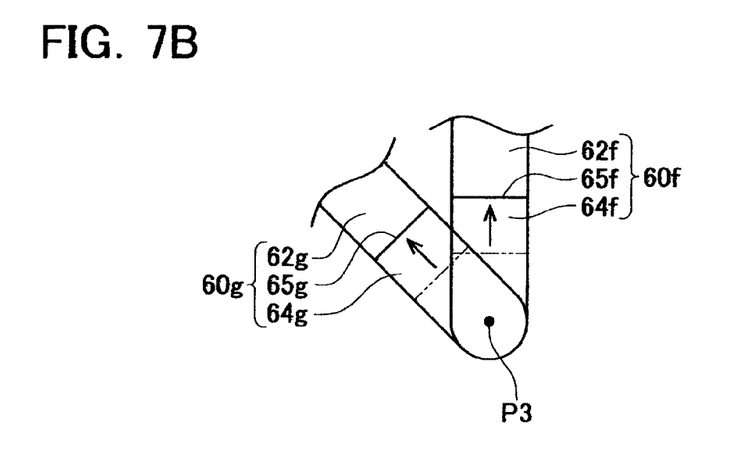
FIG. 7B is a diagram illustrating a process when the rod bodies overlap each other (2).
Figure 7C:
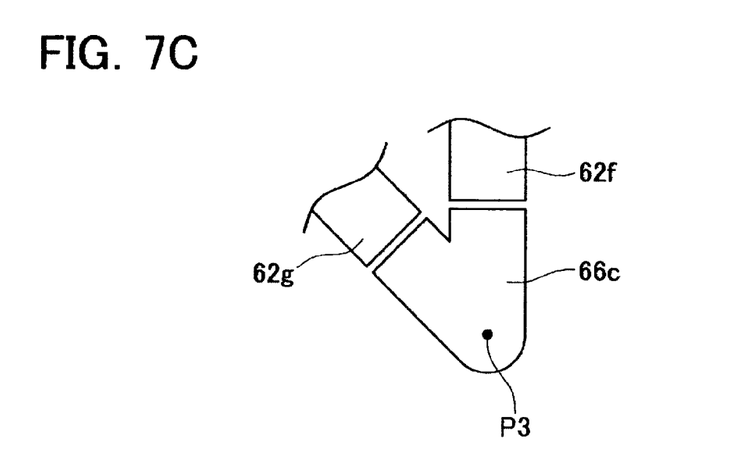
FIG. 7C is a diagram illustrating a process when the rod bodies overlap each other (3).

When the rod is allocated in the 3-dimensional space, the adjacent rod bodies may interfere with each other. The process in such a case will be described. For example, as illustrated in FIG. 7A, a case is assumed in which a rod 60f and a rod 60g are allocated so that the terminals thereof are positioned at a coordinate P3. At this time, a part of the rod body 62f overlaps a part of the rod body 62g (the range Q of FIG. 7A). The CAD operator adjusts a position of a boundary 65f between the rod terminal 64f and the rod body 62f in the rod 60f so as to solve the overlap of the rod bodies 62f and 62g. In other words, the CAD operator lengthens the length Lf of the column of the rod terminal 64f so as to solve the overlap of the rod body 62f (FIG. 7B). In the similar way, the CAD operator adjusts a position of a boundary 65g between the rod terminal 64g and the rod body 62g in the rod 60g. In other words, the CAD operator lengthens the length Lg of the column of the rod terminal 64g so as to solve the overlap of the rod body 62g. After the overlap is solved, the CAD operator executes a process of merging the terminal data of the rod terminals 64f and 64g overlapped each other by using the CAD program. Then, as illustrated in FIG. 7C, the shape data of the joint 66c is generated. The shape data of the joint 66c and the shape data of the rod bodies 62f and 62g are obtained as a part of the CAD data of the evaporative pattern. Furthermore, since the rod terminals have the spherical shape as illustrated in FIGS. 7A to 7C, the spheres of the terminals perfectly overlap each other in any case in which the rods are connected to each other at a certain angle. For this reason, the shape of the generated joint becomes simple.

Figure 8:
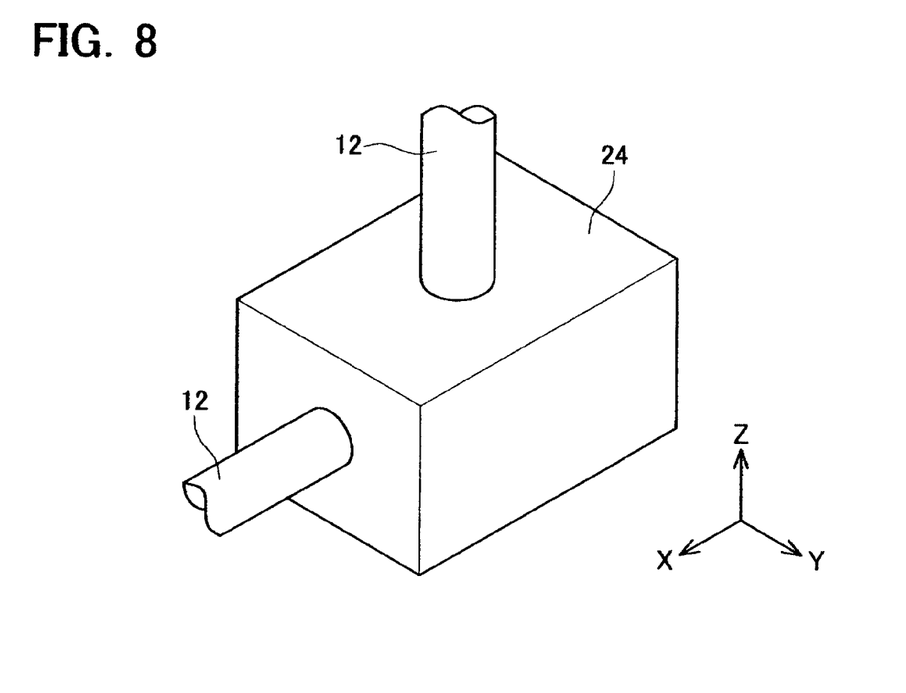
FIG. 8 is a perspective view illustrating a portion where a block and a rod are connected to each other.

Finally, an operation of generating CAD data of the connection portion between the rod and the block (the design block 20, the positioning blocks 24, and the like) will be described. As illustrated in FIG. 8, as an example, a case of generating the CAD data of the evaporative pattern having two rods 12 connected to the positioning block 24 will be explained.

Figure 9A:
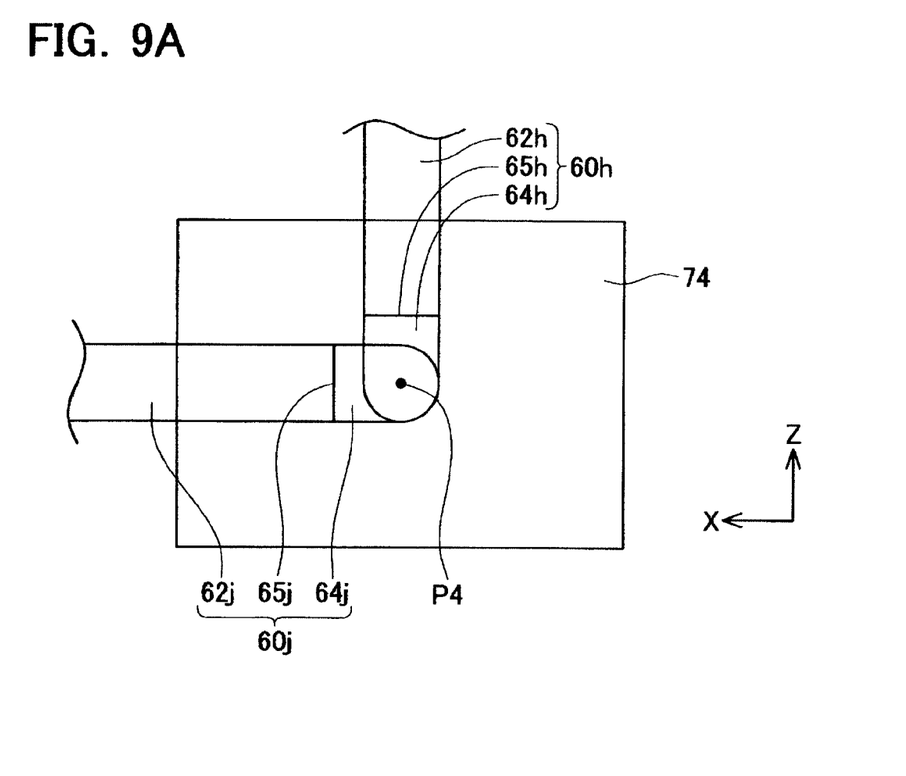
FIG. 9A is a diagram illustrating a process of generating data of the connection portion between the block and the rod (1).
Figure 9B:
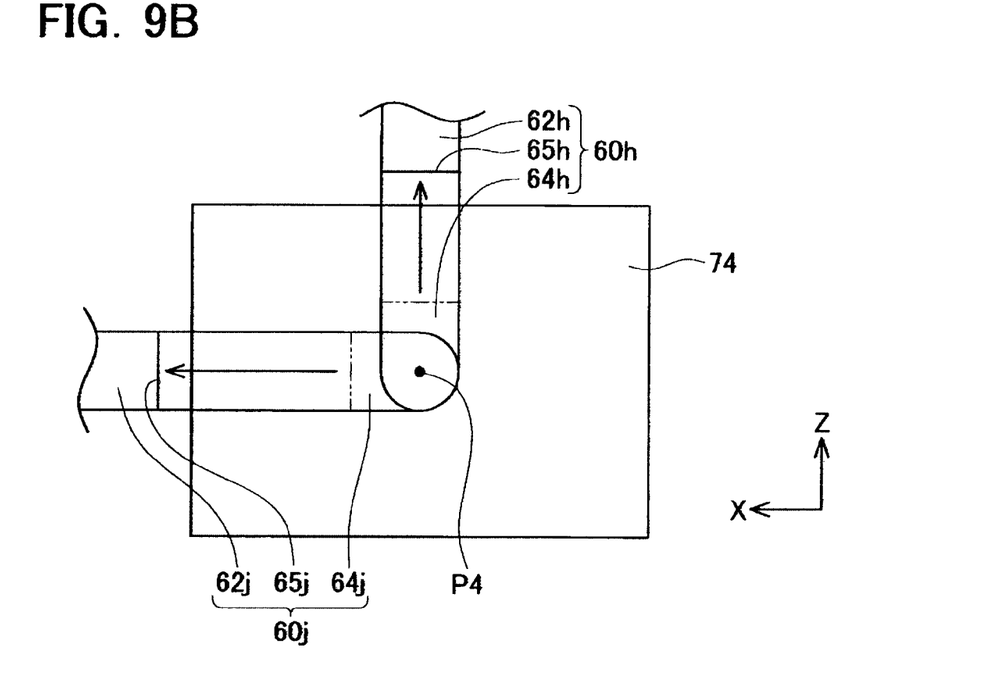
FIG. 9B is a diagram illustrating a process of generating data of the connection portion between the block and the rod (2).

First, a block 74 corresponding to the positioning block 24 is allocated in the 3-dimensional space. Here, the block 74 is allocated at a coordinate P4. Next, the rods 60h and 60j are allocated (FIG. 9A). At this time, the terminal of the rod 60h and the terminal of the rod 60j are both allocated at the coordinate P4. In FIG. 9A, a part of the rod body 62h and a part of the rod body 62j overlap the block 74. Therefore, a boundary 65h between the rod body 62h and the rod terminal 64h is moved so as to solve the overlap of the rod body 62h (FIG. 9B). In the similar way, a boundary 65j between the rod body 62j and the rod terminal 64j is moved so as to solve the overlap of the rod body 62j. As described above, in practice, the CAD operator adjusts the length of the column of the rod terminal. In this way, the overlap of the rod bodies 62h and 62j is solved (FIG. 9B).

Figure 9C:
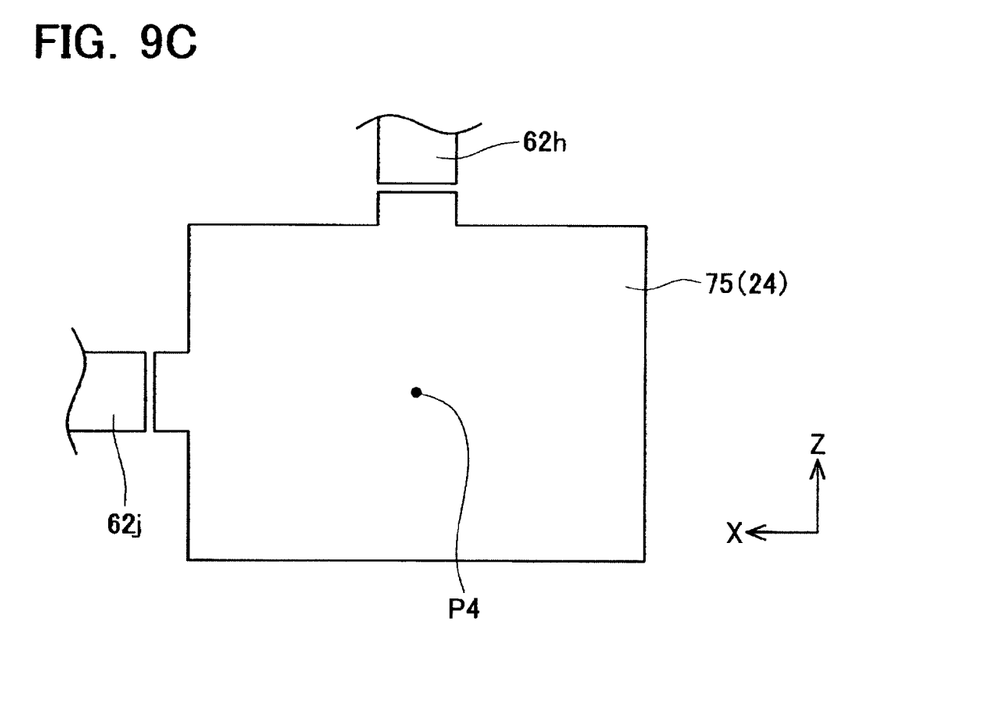
FIG. 9C is a diagram illustrating a process of generating data of the connection portion between the block and the rod (3).

Finally, the CAD operator executes a process of merging the shape data of the overlapped components, that is, the block 74 and the rod terminals 64h and 64j using the CAD program. As a result, as illustrated in FIG. 9C, the overlapped shape of the block 74 and the rod terminals 64h and 64j is generated as one shape data. The shape data corresponds to the data of the shape of the block 75 (the positioning block 24 including the rod terminal) of which the center is allocated at the coordinate P4. The shape data of the block 75 and the shape data of the rod bodies 62h and 62j may be obtained as a part of the CAD data of the evaporative pattern.

Some notable points in the method for generating CAD data of the embodiment will be described. The shape of the rod is not limited to the columnar shape. The rod may be a square pole or a polygonal pole. Further, in the embodiment, the radius of the sphere of the rod terminal is equal to the radius of the column of the rod terminal. The radius of the column of the rod terminal may be smaller than the radius of the sphere of the rod terminal. Furthermore, in a case of generating CAD data of the shape in which a plurality of rods is connected to the block, the plurality of rods may be allocated so that the terminals overlap the block. The centers of the plurality of rod terminals may not necessarily match each other.

When the CAD data is obtained, the evaporative pattern will be made based on the CAD data. At this time, the joint and the rod body may be individually made, or alternatively a component may be made by integrating the joint and the rod body. In the former case, the individually made components are attached to each other, thereby obtaining the whole evaporative pattern.

While the specific examples of the invention have been described in detail, these are merely examples of the invention, and are not considered as limiting the claims. The description of the claims includes various modifications and changes of the above-described embodiments. The technical elements described in the description or the drawings exhibit the technical utility solely or by various combinations, and are not limited to the combination of the claims of the application. Further, the techniques exemplified in the description or the drawings may attain multiple purposes at the same time, and the technical utility may be obtained by attaining one of the purposes.

List of Reference Signs

2: die (evaporative pattern), 10: frame, 12: rod, 20: design block, 24: positioning block, 25: guide pin, 30: support block, 50: press machine, 51: bolster, 52: slider, 53: column, 55: actuator, 60: rod, 62: rod body, 64: rod terminal, 66: joint, 75: block

The invention claimed is:

1. A method for generating CAD data for an evaporative pattern having a frame structure, the method comprising:
  preparing rod data that represents a rod, the rod data including rod body data representing a shape of a rod body and terminal data representing a shape of a rod terminal that is disposed at an end of the rod body;
  allocating a plurality of the rods in a virtual 3-dimensional space generated by a computer so as to overlap the rod terminals;

generating joint shape data by merging the terminal data of the overlapped rod terminals in the 3-dimensional space; and extracting the rod body data from the rod data of the rods allocated in the 3-dimensional space.

2. The method for generating CAD data of claim 1, wherein:

a shape of the rod terminal is a sphere;

the terminal data includes a radius of the sphere and a length of a column extending from the sphere and connected to the rod body; and in the allocating, the plurality of rods is allocated in the 3-dimensional space so as to overlap centers of the spheres of the rod terminals.

3. The method for generating CAD data of claim 2, wherein the generating of the joint shape data includes adjusting the length of the column included in the terminal data so that the rod bodies do not overlap each other in the 3-dimensional space.

* * * * *